United States Patent
Ku

(10) Patent No.: US 10,670,516 B2
(45) Date of Patent: Jun. 2, 2020

(54) OPTICAL CONCENTRATION SENSOR PROTECTIVE CASING AND OPTICAL CONCENTRATION TESTING DEVICE

(71) Applicant: DONGGUAN ZHENGYANG ELECTRONIC MECHANICAL CO., LTD., Dongguan (CN)

(72) Inventor: Yi-Hsin Ku, Dongguan (CN)

(73) Assignee: DONGGUAN ZHENGYANG ELECTRONIC MECHANICAL CO., LTD., Guangdong (CN)

( * ) Notice: Subject to any disclaimer, the term of this patent is extended or adjusted under 35 U.S.C. 154(b) by 0 days.

(21) Appl. No.: 16/079,702

(22) PCT Filed: Feb. 26, 2016

(86) PCT No.: PCT/CN2016/074697
§ 371 (c)(1),
(2) Date: Aug. 24, 2018

(87) PCT Pub. No.: WO2017/143590
PCT Pub. Date: Aug. 31, 2017

(65) Prior Publication Data
US 2019/0072480 A1 Mar. 7, 2019

(51) Int. Cl.
| | | |
|---|---|---|
| *G01N 21/05* | (2006.01) | |
| *G01N 21/01* | (2006.01) | |
| *B60K 13/04* | (2006.01) | |
| *F01N 3/20* | (2006.01) | |
| *G01N 21/25* | (2006.01) | |

(52) U.S. Cl.
CPC ............ *G01N 21/05* (2013.01); *B60K 13/04* (2013.01); *F01N 3/2066* (2013.01); *G01N 21/01* (2013.01); *G01N 21/25* (2013.01); *G01N 2021/054* (2013.01); *G01N 2201/022* (2013.01); *G01N 2201/0216* (2013.01)

(58) Field of Classification Search
CPC ............ G01N 21/05; G01N 2201/022; G01N 2021/054; G01N 2201/0216; G01N 21/25; B60K 13/04; F01N 3/2066
USPC .................. 356/246, 335-343, 432-440, 73
See application file for complete search history.

(56) References Cited

U.S. PATENT DOCUMENTS

| | | | |
|---|---|---|---|
| 3,560,099 A | 2/1971 | Boe | |
| 3,709,616 A * | 1/1973 | Jonsson | G01N 21/05 356/246 |

(Continued)

FOREIGN PATENT DOCUMENTS

| | | |
|---|---|---|
| KR | 101221880 | 1/2013 |
| KR | 20150121310 | 10/2015 |

OTHER PUBLICATIONS

International Search Report cited in PCT/CN2016/074697, dated Nov. 29, 2016. (6 pages).

(Continued)

*Primary Examiner* — Hoa Q Pham
(74) *Attorney, Agent, or Firm* — Workman Nydegger

(57) ABSTRACT

Provided is an optical concentration sensor protective casing, including an outer cover and a bubble isolation shield. The bubble isolation shield is embedded on the inner side of the outer cover. The outer cover is provided with a convection hole. The bubble isolation shield is provided with a liquid intake hole. Further provided is an optical concentration testing device including the protective casing.

20 Claims, 4 Drawing Sheets

(56) References Cited

U.S. PATENT DOCUMENTS 3,849,002 A     11/1974   Hach
5,831,727 A * 11/1998   Stream ............... B01D 19/0042
                                                                           356/246
8,663,562 B2 *   3/2014   Nelson .................. G01N 21/05
                                                                           210/622

OTHER PUBLICATIONS

European Search Report cited in PCT/CN2016074697 dated Oct. 17, 2019.

* cited by examiner

OPTICAL CONCENTRATION SENSOR PROTECTIVE CASING AND OPTICAL CONCENTRATION TESTING DEVICE

CROSS-REFERENCE TO RELATED APPLICATIONS

This is a National Stage Application, filed under 35 U.S.C. 371, of International Patent Application No. PCT/CN2016/074697, filed on Feb. 26, 2016, the disclosure of which is incorporated herein by reference in its entirety.

TECHNICAL FIELD

The present application relates to the field of sensor technology. For example, the present application relates to an optical concentration sensor protective casing and optical concentration testing device.

BACKGROUND

A urea solution or a urea-based solution is often used in automobiles to reduce exhaust emissions. For example, some diesel-powered motor vehicles include a urea tank separated from the fuel tank. The urea tank is used for carrying a working fluid such as an automotive urea solution. The automotive urea solution is stored in the urea tank and injected into the exhaust of a vehicle to convert nitrogen oxides into basic nitrogen and water, thereby reducing harmful emissions from the vehicle.

The overall implementation of the National Standard IV and higher emission standards requires that all heavy-duty commercial vehicles must be equipped with an SCR system or an equivalent emission after-treatment device. Most of existing automobile manufacturers prefer the SCR system and thus urea is necessary. Only when it is ensured that the automobile urea solution is in a certain concentration range, can the oxide be fully converted into nitrogen and water. The excessive of concentration will cause secondary pollution of NH3. The lack of concentration cannot ensure that the emission standards are met. The use of tap water or sea water out of fraud or the adding of other solvents such as diesel oil by mistake may even cause damages to the expensive after-treatment system. With the enforcement of an on-board diagnostics (OBD) system, if the emission standards are not met or the quality and concentration of urea does not meet the requirements, the torque of the vehicle is limited and even the vehicle cannot be started. Therefore, with the implementation of Euro VI standards, a quality sensor becomes a mandatory installation component. Based on the above situation, the precision of detecting the concentration of urea in a urea solution is very important.

A sensor for measuring a liquid is disclosed in the existing art.

The sensor includes: a light source operatively coupled to an inner chamber disposed in a liquid solution and configured to emit light and transmit the light to the inner chamber; a light detector operatively coupled to the inner chamber and configured to receive at least a portion of the light from the inner chamber; and a controller configured to determine a concentration or quality of the liquid solution on a basis of the light emitted by the light source and the portion of the light received by the light detector.

Although the above-mentioned sensor for measuring a liquid may measure the concentration of urea, factors affecting the testing precision in the urea concentration testing process cannot be eliminated. For example, bubbles in the solution to be tested cannot be eliminated in advance. If the solution to be tested is bubble-doped, the precision of testing the concentration of urea will be affected. Therefore, the result of testing the concentration of urea obtained has low reliability.

SUMMARY

Embodiments of the present disclosure provide an optical concentration sensor protective casing to protect a sensor body from being damaged due to collision or squeeze to the sensor body, thereby prolonging the service life of the sensor body.

The embodiments of the present disclosure further provide an optical concentration sensor protective casing to make a solution to be tested inside the protective casing tend to be still, thereby improving the reliability of the testing result.

The embodiments of the present disclosure further provide an optical concentration testing device to effectively protect the sensor body, prolong the service life of the sensor body, and improve the testing precision.

According to one aspect, an optical concentration sensor protective casing is provided, including an outer cover and a bubble isolation shield. The bubble isolation shield is embedded on an inner side of the outer cover.

The outer cover is provided with a convection hole.

The bubble isolation shield is provided with a liquid intake hole.

The outer cover and the bubble isolation shield may be both made of lightproof materials.

The protective casing may be arranged to protect the sensor body from being damaged due to collision or squeeze to the sensor body, thereby prolonging the service life of the sensor body.

In an embodiment, the protective casing further includes an air hole baffle plate. The outer cover is provided with a first exhaust hole, the air hole baffle plate covers the first exhaust hole, and an interstice exists between the air hole baffle plate and the first exhaust hole.

The optical concentration sensor protective casing may further include a middle fixing frame, an upper fixing support, a lower fixing support, and a fixing ring. The outer cover and the bubble isolation shield are mounted at one end of the middle fixing frame, the fixing ring is mounted at the other end of the middle fixing frame, and the upper fixing support and the lower fixing support are nested on the outer sides of the middle fixing frame. The bubble isolation shield and the inner space of the middle fixing frame form a testing section for a solution to be tested.

The air hole baffle plate may be secured to the upper fixing support.

The air hole baffle plate may be secured to the middle fixing frame.

The air hole baffle plate may be secured to the outer cover.

The air hole baffle plate may be disposed on the outer side of the first exhaust hole, so as to prevent the solution to be tested from directly entering the testing section through the first exhaust hole and prevent such pollutants as dust from entering the testing section through the first exhaust hole and affecting the precision of the testing result, thereby ensuring the reliability of the testing result.

In an embodiment, the bubble isolation shield is provided with a second exhaust hole, the first exhaust hole and the second exhaust hole intercommunicate.

The central axis of the first exhaust hole and the central axis of the second exhaust hole may be a same straight line.

The first exhaust hole and the second exhaust hole, which intercommunicate, may be provided for cross-ventilation between the testing section and the outside, thereby ensuring that the solution to be tested may enter the testing section.

In an embodiment, an obstacle is disposed between the convection hole and the liquid intake hole and the solution to be tested bypasses the obstacle from the convection hole to the liquid intake hole.

The obstacle may be disposed between the convection hole and the liquid intake hole, so that the solution to be tested needs to bypass the obstacle to reach the liquid intake hole, thereby effectively separating bubbles from the liquid of the solution to be tested and ensuring that the solution to be tested entering the testing section is free of bubbles.

In an embodiment, the outer cover is provided with two convection holes, the obstacle includes two separating plates, the liquid intake hole is disposed between the two separating plates, and the two convection holes are disposed on respective outer sides of the two separating plates.

The two convection holes may be provided, to enable the effective convection between the inner side and the outer side of the outer cover, so that the solution to be tested may quickly enter the outer cover.

The two convection holes are disposed on respective outer sides of the two separating plates, so that the separating plates may effectively space the convection holes and the liquid intake hole out, thereby more effectively separating bubbles from the liquid of the solution to be tested.

In an embodiment, the two separating plates are arranged in a splayed pattern.

The separating plates may be disposed on a slant, so that bubbles in the solution to be tested may float up and be discharged easily along the separating plates.

In an embodiment, the two separating plates include a first separating plate and a second separating plate, the liquid intake hole is located between the first separating plate and the second separating plate and at an end where a distance between the first separating plate and the second separating plate is larger, and the liquid intake hole abuts the second separating plate.

In a working state, the first separating plate may be located above the second separating plate. In the solution, the liquid intake hole abuts the second separating plate, that is, the liquid intake hole is disposed at a relatively lower position, to prevent bubbles in the solution to be tested from entering the testing section through the liquid intake hole.

In an embodiment, the outer cover has an open end and a closed end, and the convection holes are disposed on the periphery of the closed end of the outer cover; the bubble isolation shield has an open end and a closed end, the obstacle and the liquid intake hole are both disposed at the closed end of the bubble isolation shield, and a bubble separating cavity is formed between the closed end of the bubble isolation shield and the closed end of the outer cover.

In an embodiment, the bubble isolation shield is made of elastic materials.

The bubble isolation shield may be made of rubber.

The bubble isolation shield may be made of elastic materials, so that the bubble isolation shield may buffer the acting force of the solution to be tested due to icing to avoid the damages to the product caused by the acting force of the solution to be tested due to icing.

According to another aspect, an optical concentration testing device is provided, including the above-mentioned optical concentration sensor protective casing.

The optical concentration testing device is configured to detect the concentration of urea in the urea solution.

In an embodiment, the device further includes a sensor body, the sensor body is provided with a testing gap and the testing gap opens in a horizontal direction.

The sensor body may be mounted within the middle fixing frame.

The testing gap may be disposed on the horizontal side wall of the sensor body, so that bubbles in the solution to be tested may float up and be discharged easily along the testing gap and thus be eliminated, thereby improving the precision of the testing result.

The embodiments of the present disclosure have the following beneficial effects:

(1) An optical concentration sensor protective casing is provided to protect the sensor body from being damaged due to collision or squeeze to the sensor body, thereby prolonging the service life of the sensor body.

(2) An optical concentration sensor protective casing is provided to make the solution to be tested inside the protective casing tend to be still, thereby improving the reliability of the testing result.

(3) An optical concentration sensor protective casing is provided. With the liquid intake hole disposed between the two separating plates, the solution to be tested needs to bypass the separating plates to reach the liquid intake hole, thereby effectively separating bubbles from the liquid of the solution to be tested and ensuring that the solution to be tested entering the testing section is free of bubbles.

(4) An optical concentration sensor protective casing is provided. The air hole baffle plate is disposed on the outer side of the first exhaust hole to prevent the solution to be tested from directly entering the testing section through the first exhaust hole and prevent such pollutants as dust that affect the precision of the testing result from entering the testing section through the first exhaust hole, thereby ensuring the reliability of the testing result.

(5) An optical concentration sensor protective casing is provided. The bubble isolation shield is made of elastic materials, so that the bubble isolation shield may buffer the acting force of the solution to be tested due to icing, so as to avoid the damages to the product caused by the acting force of the solution to be tested due to icing.

(6) An optical concentration testing device is provided. The separating plates are disposed within the protective casing, so that the solution to be tested needs to bypass the separating plates to reach the liquid intake hole, thereby effectively separating bubbles from the liquid of the solution to be tested, ensuring that the solution to be tested entering the testing section is free of bubbles, and improving the precision of testing the concentration of the solution to be tested.

(7) An optical concentration testing device is provided. The testing gap is provided on the horizontal side wall of the sensor body, so that bubbles in the solution to be tested may float up and be discharged easily along the testing gap and thus be eliminated, thereby improving the precision of the testing result.

BRIEF DESCRIPTION OF DRAWINGS

The present disclosure will be described in detail with reference to the accompanying drawings and embodiments.

In FIGS. 1 to 12:

1: Outer cover; 11: Convection hole; 12: First exhaust hole

2: Bubble isolation shield; 21: First separating plate; 22: Second separating plate; 23: Liquid intake hole; 24: Second exhaust hole 3: Middle fixing frame; 4: Upper fixing support; 5: Lower fixing support; 6: Fixing ring; 7: Air hole baffle plate;

8: Sensor body; 81: Testing gap.

DETAILED DESCRIPTION

The present disclosure are described hereinafter through embodiments in conjunction with the accompanying drawings.

Embodiment 1

Figure 1:
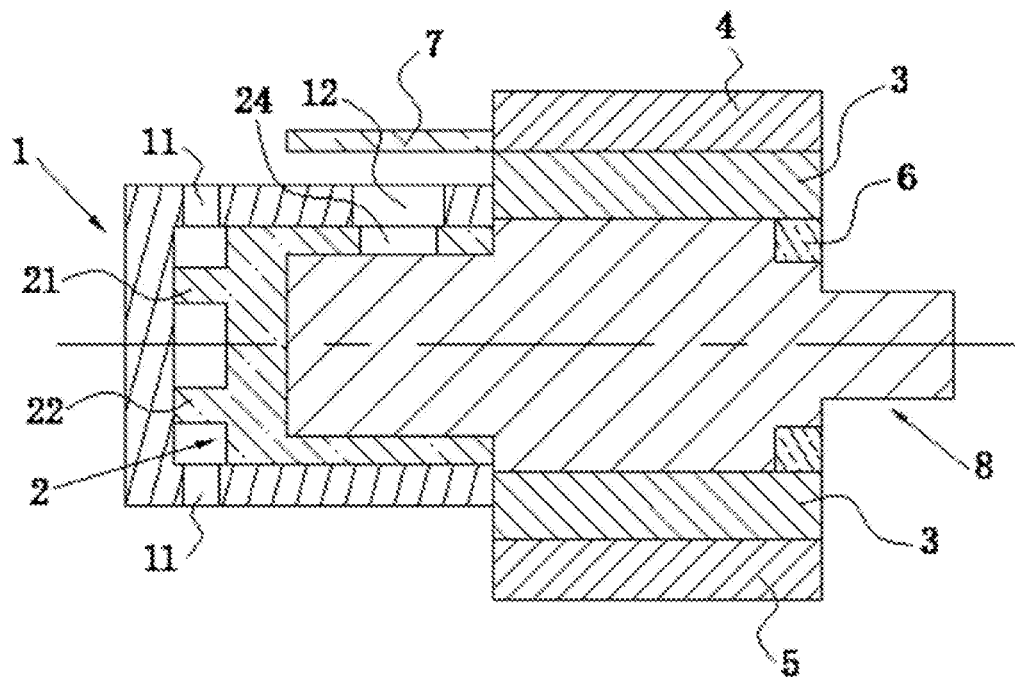
FIG. 1 is a section view of an optical concentration testing device according to an embodiment 1.
Figure 2:
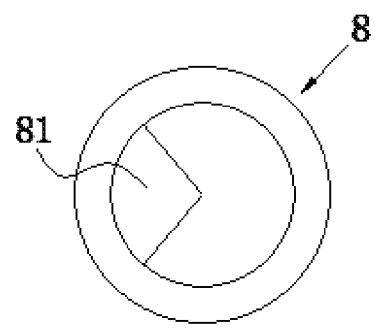
FIG. 2 is a side view of a bubble isolation shield according to the embodiment 1.
Figure 3:
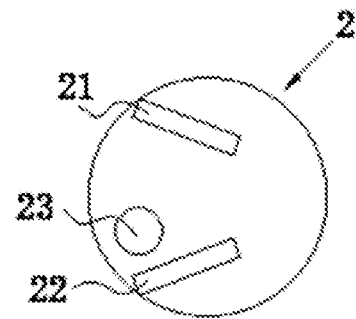
FIG. 3 is a side view of a sensor body according to the embodiment 1.

As shown in FIG. 1 to FIG. 3, an optical concentration sensor protective casing includes an outer cover 1 and a bubble isolation shield 2. The bubble isolation shield 2 is embedded on an inner side of the outer cover 1. The optical concentration sensor protective casing further includes a middle fixing frame 3, an upper fixing support 4, a lower fixing support 5 and a fixing ring 6. The outer cover 1 and the bubble isolation shield 2 are mounted at one end of the middle fixing frame 3, the fixing ring 6 is mounted at the other end of the middle fixing frame 3, and the upper fixing support 4 and the lower fixing support 5 are nested on the outer sides of the middle fixing frame 3. The bubble isolation shield 2 and the inner space of the middle fixing frame 3 form a testing section for a solution to be tested.

The outer cover 1 is provided with one or more convection holes 11 and the bubble isolation shield 2 is provided with a liquid intake hole 23. An obstacle is disposed between the convection holes 11 and the liquid intake hole 23, and a solution to be tested bypasses the obstacle from the convection holes 11 to the liquid intake hole 23. In the present embodiment, the outer cover 1 is provided with two convection holes 11. The obstacle includes two separating plates. The liquid intake hole 23 and the two separating plates are disposed on the bubble isolation shield 2, the liquid intake hole 23 is disposed between the two separating plates, and the two convection holes 11 are disposed on respective outer sides of the two separating plates. In other embodiments, the separating plates may be disposed on the inner wall of the outer cover 1.

The outer cover 1 has an open end and a closed end, and the convection holes 11 are disposed on the periphery of the closed end of the outer cover 1. The bubble isolation shield 2 has an open end and a closed end, the obstacle and the liquid intake hole 23 are both disposed at the closed end of the bubble isolation shield 2, and a bubble separating cavity is formed between the closed end of the bubble isolation shield 2 and the closed end of the outer cover 1.

The two convection holes 11 may be provided to enable the effective convection between the inner side and the outer side of the outer cover 1, so that the solution to be tested may quickly enter the bubble separating cavity within the outer cover 1. The two separating plates are disposed, and the liquid intake hole 23 is disposed between the two separating plates, so that the solution to be tested needs to bypass the separating plates to reach the liquid intake hole 23, thereby effectively separating bubbles from the liquid of the solution to be tested and ensuring that the solution to be tested entering the testing section is free of bubbles. The two convection holes 11 are disposed on respective outer sides of the two separating plates, so that the separating plates may effectively space out the convection holes 11 and the liquid intake hole 23, thereby more effectively separating bubbles from the liquid of the solution to be tested.

In the present embodiment, the two separating plates are arranged in a splayed pattern. The separating plates may be disposed on a slant, so that bubbles in the solution to be tested may float up and be discharged easily along the separating plates. The two separating plates include a first separating plate 21 and a second separating plate 22, the liquid intake hole 23 is located at an end where a distance between the first separating plate 21 and the second separating plate 22 is larger, and the liquid intake hole 23 abuts the second separating plate 22. In the working state, the first separating plate 21 may be located above the second separating plate 22. The liquid intake hole 23 abuts the second separating plate 22, that is, the liquid intake hole 23 is disposed at a relatively lower position, to prevent bubbles in the solution to be tested from entering the testing section through the liquid intake hole 23.

The outer cover 1 is made of lightproof materials. The bubble isolation shield 2 is made of lightproof elastic materials. The bubble isolation shield 2 may be made of elastic materials, so that the bubble isolation shield 2 may buffer the acting force of the solution to be tested due to icing, so as to avoid the damages to the product caused by the acting force of the solution to be tested due to icing. In the present embodiment, the bubble isolation shield 2 is made of rubber.

The outer cover 1 is provided with a first exhaust hole 12 and the bubble isolation shield 2 is provided with a second exhaust hole 24. The first exhaust hole 12 and the second exhaust hole 24 intercommunicate. The first exhaust hole 12 and the second exhaust hole 24, which intercommunicate, may be provided for cross-ventilation between the testing section and the outside, thereby ensuring that the solution to be tested may enter the testing section. In the present embodiment, the central axis of the first exhaust hole 12 and the central axis of the second exhaust hole 24 are a same straight line.

The optical concentration sensor protective casing further includes an air hole baffle plate 7. The air hole baffle plate 7 covers the first exhaust hole 12 and an interstice exists between the air hole baffle plate 7 and the first exhaust hole 12. The air hole baffle plate 7 may be disposed on the outer side of the first exhaust hole 12, so as to prevent the solution to be tested from directly entering the testing section through the first exhaust hole 12 and prevent such pollutants as dust from entering the testing section through the first exhaust hole 12 and affecting the precision of the testing result, thereby ensuring the reliability of the testing result. In the present embodiment, the air hole baffle plate 7 is secured to the upper fixing support 4.

An optical concentration testing device includes the above-mentioned optical concentration sensor protective casing and a sensor body 8. The sensor body 8 is mounted in the interior of the optical concentration sensor protective casing, the sensor body 8 is provided with a testing gap 81, and the testing gap 81 opens in the horizontal direction. The testing gap 81 is disposed on the horizontal side wall of the sensor body 8, so that bubbles in the solution to be tested may float up and be discharged easily along the testing gap 81 and thus be eliminated, thereby improving the precision of the testing result. In the present embodiment, the sensor body 8 is mounted within the middle fixing frame 3. The testing gap 81 is V-shaped. The testing gap 81 of the sensor body 8 may open in the horizontal direction and the side walls of the testing gap 81 slant. In this way, if bubbles in the solution to be tested are not eliminated, the remaining bubbles will float up along the side walls of the testing gap 81 and be discharged from the second exhaust hole, thereby eliminating bubbles in the solution to be tested.

In a testing process, the solution to be tested may enter the bubble separating cavity through the convection holes 11; the solution to be tested in the bubble separating cavity is blocked by the separating plates and is forced to change the flow direction of the solution to be tested instead of directly entering the liquid intake hole 23; after the solution to be tested flows to the ends between the separating plates along the extending direction of the separating plates, the solution to be tested is no longer blocked by the separating plates and flows towards the liquid intake hole 23. Because of the small density of bubbles, the doped bubbles in the solution to be tested float up and are discharged from the solution to be tested. After bubbles are eliminated, the solution to be tested enters the testing section through the liquid intake hole 23 and the concentration of the solution to be tested is tested by the sensor body 8.

Embodiment 2

Figure 4:
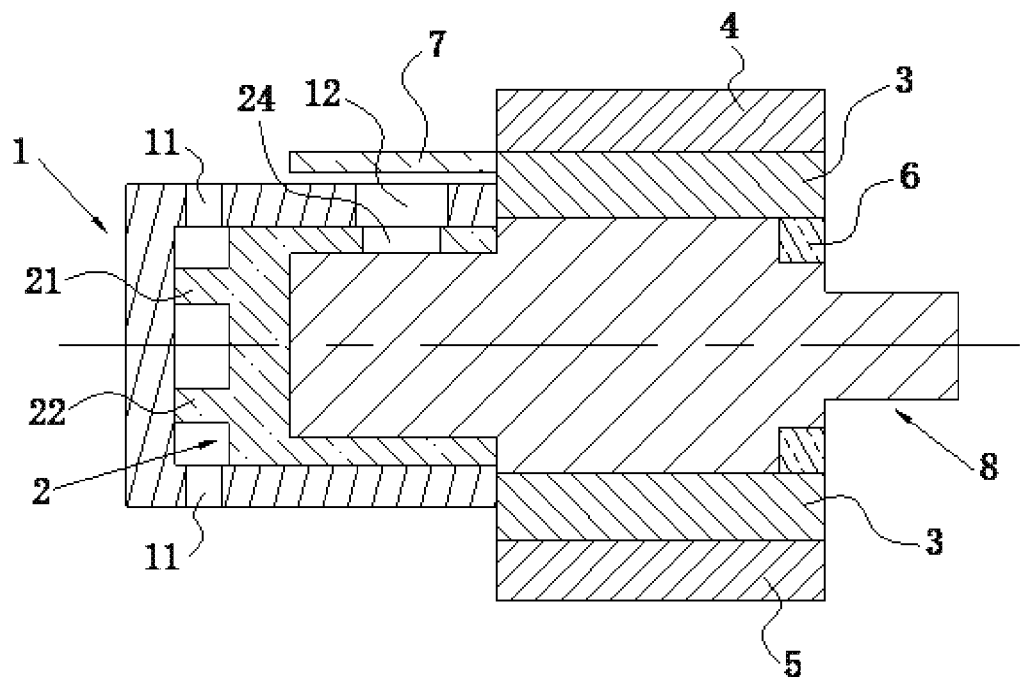
FIG. 4 is a section view of an optical concentration testing device according to an embodiment 2.
Figure 5:
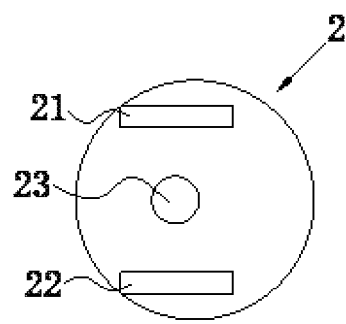
FIG. 5 is a side view of a bubble isolation shield according to the embodiment 2.
Figure 6:
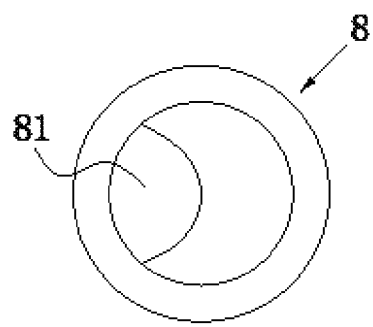
FIG. 6 is a side view of a sensor body according to the embodiment 2.

As shown in FIG. 4 to FIG. 6, an optical concentration sensor protective casing includes an outer cover 1 and a bubble isolation shield 2. The bubble isolation shield 2 is embedded on an inner side of the outer cover 1. The optical concentration sensor protective casing further includes a middle fixing frame 3, an upper fixing support 4, a lower fixing support 5 and a fixing ring 6. The outer cover 1 and the bubble isolation shield 2 are mounted at one end of the middle fixing frame 3, the fixing ring 6 is mounted at the other end of the middle fixing frame 3, and the upper fixing support 4 and the lower fixing support 5 are nested on the outer sides of the middle fixing frame 3. The bubble isolation shield 2 and the inner space of the middle fixing frame 3 form a testing section for a solution to be tested.

The outer cover 1 is provided with one or more convection holes 11 and the bubble isolation shield 2 is provided with a liquid intake hole 23. An obstacle is disposed between the convection holes 11 and the liquid intake hole 23, and a solution to be tested bypasses the obstacle from the convection holes 11 to the liquid intake hole 23. In the present embodiment, the outer cover 1 is provided with two convection holes 11. The obstacle includes two separating plates. The liquid intake hole 23 and the two separating plates are disposed on the bubble isolation shield 2, the liquid intake hole 23 is disposed between the two separating plates, and the two convection holes 11 are disposed on respective outer sides of the two separating plates. In other embodiments, the separating plates may be disposed on the inner wall of the outer cover 1.

The outer cover 1 has an open end and a closed end, and the convection holes 11 are disposed on the periphery of the closed end of the outer cover 1. The bubble isolation shield 2 has an open end and a closed end, the obstacle and the liquid intake hole 23 are both disposed at the closed end of the bubble isolation shield 2, and a bubble separating cavity is formed between the closed end of the bubble isolation shield 2 and the closed end of the outer cover 1.

The two convection holes 11 may be provided, to enable the effective convection between the inner side and the outer side of the outer cover 1, so that the solution to be tested may quickly enter the bubble separating cavity within the outer cover 1. The two separating plates are disposed, and the liquid intake hole 23 is disposed between the two separating plates, so that the solution to be tested needs to bypass the separating plates to reach the liquid intake hole 23, thereby effectively separating bubbles from the liquid of the solution to be tested and ensuring that the solution to be tested entering the testing section is free of bubbles. The two convection holes 11 are disposed on respective outer sides of the two separating plates, so that the separating plates may effectively space out the convection holes 11 and the liquid intake hole 23, thereby more effectively separating bubbles from the liquid of the solution to be tested.

In the present embodiment, the two separating plates are spaced in parallel, the two separating plates include a first separating plate 21 and a second separating plate 22, and the distance between the liquid intake hole 23 and the first separating plate 21 is equal to the distance between the liquid intake hole 23 and the second separating plate 22.

The outer cover 1 is made of lightproof materials. The bubble isolation shield 2 is made of lightproof elastic materials. The bubble isolation shield 2 may be made of elastic materials so that the bubble isolation shield 2 may buffer the acting force of the solution to be tested due to icing to, so as avoid the damages to the product caused by the acting force of the solution to be tested due to icing. In the present embodiment, the bubble isolation shield 2 is made of rubber.

The outer cover 1 is provided with a first exhaust hole 12 and the bubble isolation shield 2 is provided with a second exhaust hole 24. The first exhaust hole 12 and the second exhaust hole 24 are interconnected with each other. The first exhaust hole 12 and the second exhaust hole 24 interconnected with each other may be provided for cross-ventilation between the testing section and the outside, thereby ensuring that the solution to be tested may enter the testing section. In the present embodiment, the first exhaust hole 12 and the second exhaust hole 24 are staggered and the first exhaust hole 12 is connected to the second exhaust hole 24 via a pipe.

The optical concentration sensor protective casing further includes an air hole baffle plate 7. The air hole baffle plate 7 covers the first exhaust hole 12 and an interstice exists between the air hole baffle plate 7 and the first exhaust hole 12. The air hole baffle plate 7 may be disposed on the outer side of the first exhaust hole 12, so as to prevent the solution to be tested from directly entering the testing section through the first exhaust hole 12 and prevent such pollutants as dust from entering the testing section through the first exhaust hole 12 and affecting the precision of the testing result, thereby ensuring the reliability of the testing result. In the present embodiment, the air hole baffle plate 7 is secured to the middle fixing frame 3.

An optical concentration testing device includes the above-mentioned optical concentration sensor protective casing and a sensor body 8. The sensor body 8 is mounted in the interior of the optical concentration sensor protective casing, the sensor body 8 is provided with a testing gap 81, and the testing gap 81 opens in the horizontal direction. The testing gap 81 is disposed on the horizontal side wall of the sensor body 8 so that bubbles in the solution to be tested may float up and be discharged easily along the testing gap 81 and thus be eliminated, thereby improving the precision of the testing result. In the present embodiment, the sensor body 8 is mounted within the middle fixing frame 3. The testing gap 81 is semi-circular. The testing gap 81 of the sensor body 8 may open in the horizontal direction and the side walls of the testing gap 81 slant. In this way, if bubbles in the solution to be tested are not eliminated, the remaining bubbles will float up along the side walls of the testing gap 81 and be discharged from the second exhaust hole, thereby eliminating bubbles in the solution to be tested.

In a testing process, the solution to be tested may enter the bubble separating cavity through the convection holes 11; the solution to be tested in the bubble separating cavity is blocked by the separating plates and is forced to change the flow direction of the solution to be tested instead of directly entering the liquid intake hole 23; after the solution to be tested flows to the ends between the separating plates along the extending direction of the separating plates, the solution to be tested is no longer locked by the separating plates and flows towards the liquid intake hole 23. Because of the small density of bubbles, the doped bubbles in the solution to be tested float up and are discharged from the solution to be tested. After bubbles are eliminated, the solution to be tested enters the testing section through the liquid intake hole 23 and the concentration of the solution to be tested is tested by the sensor body 8.

Embodiment 3

Figure 7:
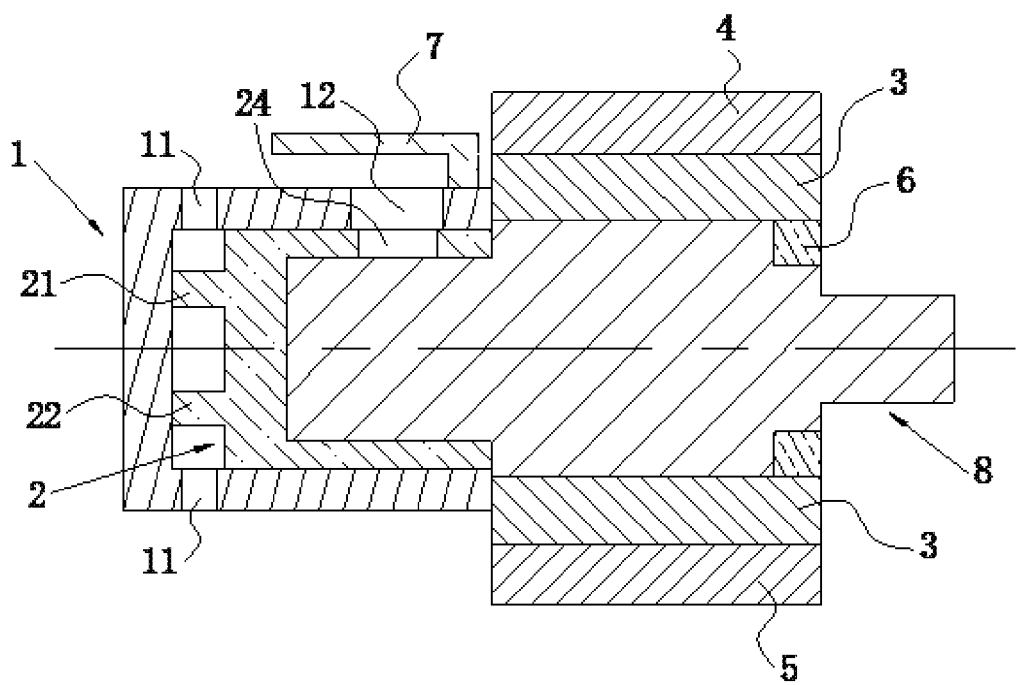
FIG. 7 is a section view of an optical concentration testing device according to an embodiment 3.
Figure 8:
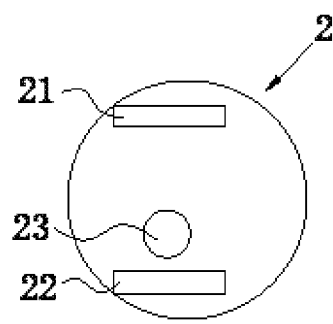
FIG. 8 is a side view of a bubble isolation shield according to the embodiment 3.
Figure 9:
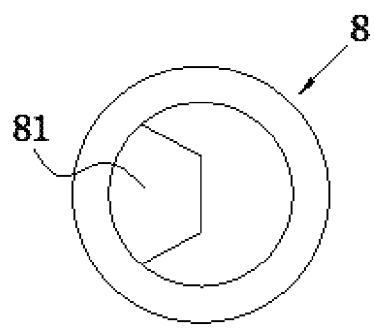
FIG. 9 is a side view of a sensor body according to the embodiment 3.

As shown in FIG. 7 to FIG. 9, an optical concentration sensor protective casing includes an outer cover 1 and a bubble isolation shield 2. The bubble isolation shield 2 is embedded on an inner side of the outer cover 1. The optical concentration sensor protective casing further includes a middle fixing frame 3, an upper fixing support 4, a lower fixing support 5 and a fixing ring 6. The outer cover 1 and the bubble isolation shield 2 are mounted at one end of the middle fixing frame 3, the fixing ring 6 is mounted at the other end of the middle fixing frame 3, and the upper fixing support 4 and the lower fixing support 5 are nested on the outer sides of the middle fixing frame 3. The inner space of the bubble isolation shield 2 and the inner space of the middle fixing frame 3 form a testing section for a solution to be tested.

The outer cover 1 is provided with one or more convection holes 11 and the bubble isolation shield 2 is provided with a liquid intake hole 23. An obstacle is disposed between the convection holes 11 and the liquid intake hole 23, and a solution to be tested bypasses the obstacle from the convection holes 11 to the liquid intake hole 23. In the present embodiment, the outer cover 1 is provided with two convection holes 11. The obstacle includes two separating plates. The liquid intake hole 23 and the two separating plates are disposed on the bubble isolation shield 2, the liquid intake hole 23 is disposed between the two separating plates, and the two convection holes 11 are disposed on respective outer sides of the two separating plates. In other embodiments, the separating plates may be disposed on the inner wall of the outer cover 1.

The outer cover 1 has an open end and a closed end, and the convection holes 11 are disposed on the periphery of the closed end of the outer cover 1. The bubble isolation shield 2 has an open end and a closed end, the obstacle and the liquid intake hole 23 are both disposed at the closed end of the bubble isolation shield 2, and a bubble separating cavity is formed between the closed end of the bubble isolation shield 2 and the closed end of the outer cover 1.

The two convection holes 11 may be provided, to enable the effective convection between the inner side and the outer side of the outer cover 1 so that the solution to be tested may quickly enter the bubble separating cavity within the outer cover 1. The two separating plates are disposed, and the liquid intake hole 23 is disposed between the two separating plates, so that the solution to be tested needs to bypass the separating plates to reach the liquid intake hole 23, thereby effectively separating bubbles from the liquid of the solution to be tested and ensuring that the solution to be tested entering the testing section is free of bubbles. The two convection holes 11 are disposed on respective outer sides of the two separating plates so that the separating plates may effectively space out the convection holes 11 and the liquid intake hole 23, thereby more effectively separating bubbles from the liquid of the solution to be tested.

In the present embodiment, the two separating plates are spaced in parallel, the two separating plates include a first separating plate 21 and a second separating plate 22, and the liquid intake hole 23 abuts the second separating plate 22, that is, the distance between the liquid intake hole 23 and the first separating plate 21 is larger than the distance between the liquid intake hole 23 and the second separating plate 22. In the working state, the first separating plate 21 may be located above the second separating plate 22. The liquid intake hole 23 abuts the second separating plate 22, that is, the liquid intake hole 23 is disposed at a relatively lower position, to prevent bubbles in the solution to be tested from entering the testing section through the liquid intake hole 23.

The outer cover 1 is made of lightproof materials. The bubble isolation shield 2 is made of lightproof elastic materials. The bubble isolation shield 2 may be made of elastic materials so that the bubble isolation shield 2 may buffer the acting force of the solution to be tested due to icing, so as to avoid the damages to the product caused by the acting force of the solution to be tested due to icing. In the present embodiment, the bubble isolation shield 2 is made of rubber.

The outer cover 1 is provided with a first exhaust hole 12 and the bubble isolation shield 2 is provided with a second exhaust hole 24. The first exhaust hole 12 and the second exhaust hole 24 intercommunicate. The first exhaust hole 12 and the second exhaust hole 24, which intercommunicate, may be provided for cross-ventilation between the testing section and the outside, thereby ensuring that the solution to be tested may enter the testing section. In the present embodiment, the central axis of the first exhaust hole 12 and the central axis of the second exhaust hole 24 are a same straight line.

The optical concentration sensor protective casing further includes an air hole baffle plate 7. The air hole baffle plate 7 covers the first exhaust hole 12 and an interstice exists between the air hole baffle plate 7 and the first exhaust hole 12. The air hole baffle plate 7 may be disposed on the outer side of the first exhaust hole 12, so as to prevent the solution to be tested from directly entering the testing section through the first exhaust hole 12 and prevent such pollutants as dust from entering the testing section through the first exhaust hole 12 and affecting the precision of the testing result, thereby ensuring the reliability of the testing result. In the present embodiment, the air hole baffle plate 7 is secured to the outer cover 1.

An optical concentration testing device includes the above-mentioned optical concentration sensor protective casing and a sensor body 8. The sensor body 8 is mounted in the interior of the optical concentration sensor protective casing, the sensor body 8 is provided with a testing gap 81, and the testing gap 81 opens in the horizontal direction. The testing gap 81 is disposed on the horizontal side wall of the sensor body 8, so that bubbles in the solution to be tested may float up and be discharged easily along the testing gap 81 and thus be eliminated, thereby improving the precision of the testing result. In the present embodiment, the sensor body 8 is mounted within the middle fixing frame 3. The testing gap 81 is trapezoidal. The testing gap 81 of the sensor body 8 may open in the horizontal direction and the side walls of the testing gap 81 slant. In this way, if bubbles in the solution to be tested are not eliminated, the remaining bubbles will float up along the side walls of the testing gap 81 and be discharged from the second exhaust hole, thereby eliminating bubbles in the solution to be tested.

In a testing process, the solution to be tested may enter the bubble separating cavity through the convection holes 11; the solution to be tested in the bubble separating cavity is blocked by the separating plates and is forced to change the flow direction of the solution to be tested instead of directly entering the liquid intake hole 23; after the solution to be tested flows to the ends between the separating plates along the extending direction of the separating plates, the solution to be tested is no longer blocked by the separating plates and flows towards the liquid intake hole 23. Because of the small density of bubbles, the doped bubbles in the solution to be tested float up and are discharged from the solution to be tested. After bubbles are eliminated, the solution to be tested enters the testing section through the liquid intake hole 23 and the concentration of the solution to be tested is tested by the sensor body 8.

Embodiment 4

Figure 10:
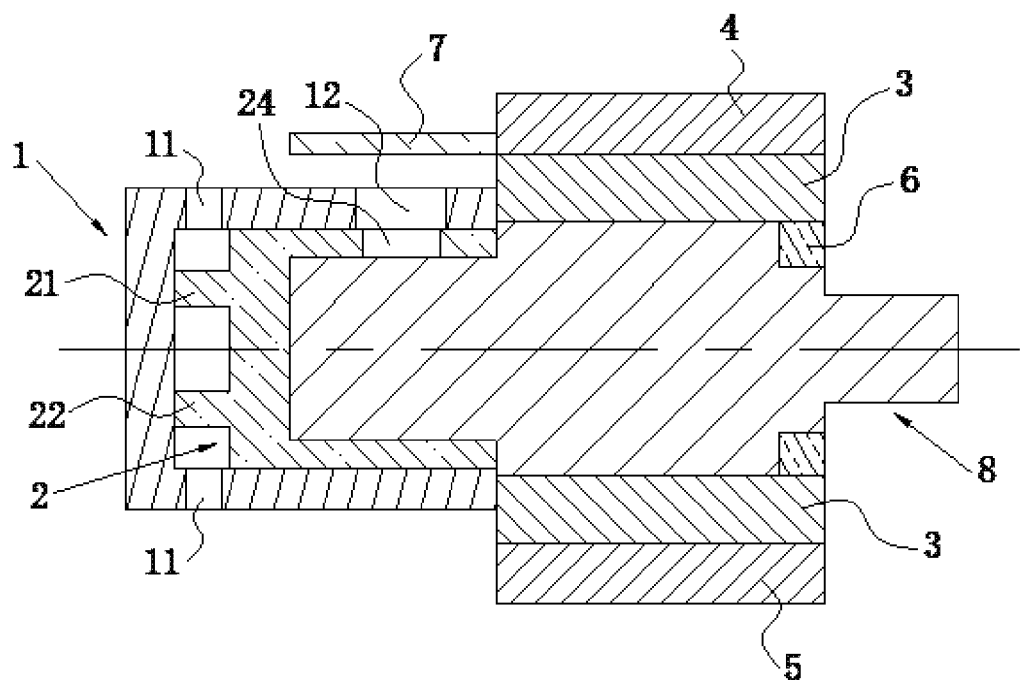
FIG. 10 is a section view of an optical concentration testing device according to an embodiment 4.
Figure 11:
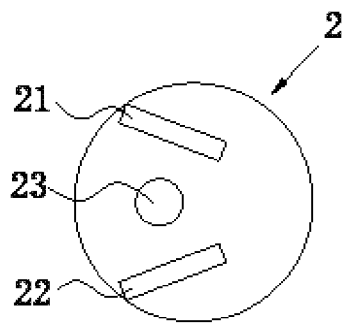
FIG. 11 is a side view of a bubble isolation shield according to the embodiment 4.
Figure 12:
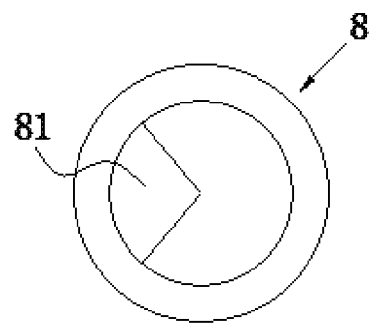
FIG. 12 is a side view of a sensor body according to the embodiment 4.

As shown in FIG. 10 to FIG. 12, an optical concentration sensor protective casing includes an outer cover 1 and a bubble isolation shield 2. The bubble isolation shield 2 is embedded on an inner side of the outer cover 1. The optical concentration sensor protective casing further includes a middle fixing frame 3, an upper fixing support 4, a lower fixing support 5 and a fixing ring 6. The outer cover 1 and the bubble isolation shield 2 are mounted at one end of the middle fixing frame 3, the fixing ring 6 is mounted at the other end of the middle fixing frame 3, and the upper fixing support 4 and the lower fixing support 5 are nested on the outer sides of the middle fixing frame 3. The bubble isolation shield 2 and the inner space of the middle fixing frame 3 form a testing section for a solution to be tested.

The outer cover 1 is provided with one or more convection holes 11 and the bubble isolation shield 2 is provided with a liquid intake hole 23. An obstacle is disposed between the convection holes 11 and the liquid intake hole 23, and a solution to be tested bypasses the obstacle from the convection holes 11 to the liquid intake hole 23. In the present embodiment, the outer cover 1 is provided with two convection holes 11. The obstacle includes two separating plates. The liquid intake hole 23 and the two separating plates are disposed on the bubble isolation shield 2, the liquid intake hole 23 is disposed between the two separating plates, and the two convection holes 11 are disposed on respective outer sides of the two separating plates. In other embodiments, the separating plates may be disposed on the inner wall of the outer cover 1.

The outer cover 1 has an open end and a closed end, and the convection holes 11 are disposed on the periphery of the closed end of the outer cover 1. The bubble isolation shield 2 has an open end and a closed end, the obstacle and the liquid intake hole 23 are both disposed at the closed end of the bubble isolation shield 2, and a bubble separating cavity is formed between the closed end of the bubble isolation shield 2 and the closed end of the outer cover 1.

The two convection holes 11 may be provided to enable the effective convection between the inner side and the outer side of the outer cover 1, so that the solution to be tested may quickly enter the bubble separating cavity within the outer cover 1. The two separating plates are disposed, and the liquid intake hole 23 is disposed between the two separating plates, so that the solution to be tested needs to bypass the separating plates to reach the liquid intake hole 23, thereby effectively separating bubbles from the liquid of the solution to be tested and ensuring that the solution to be tested entering the testing section is free of bubbles. The two convection holes 11 are disposed on respective outer sides of the two separating plates, so that the separating plates may effectively space out the convection holes 11 and the liquid intake hole 23, thereby more effectively separating bubbles from the liquid of the solution to be tested.

In the present embodiment, the two separating plates are arranged in a splayed pattern. The separating plates may be disposed on a slant so that bubbles in the solution to be tested may float up and be discharged easily along the separating plates. The two separating plates include a first separating plate 21 and a second separating plate 22, the liquid intake hole 23 is located at an end where a distance between the first separating plate 21 and the second separating plate 22 is larger, and the distance between the liquid intake hole 23 and the first separating plate 21 is equal to the distance between the liquid intake hole 23 and the second separating plate 22.

The outer cover 1 is made of lightproof materials. The bubble isolation shield 2 is made of lightproof elastic materials. The bubble isolation shield 2 may be made of elastic materials, so that the bubble isolation shield 2 may buffer the acting force of the solution to be tested due to icing, so as to avoid the damages to the product caused by the acting force of the solution to be tested due to icing. In the present embodiment, the bubble isolation shield 2 is made of rubber.

The outer cover 1 is provided with a first exhaust hole 12 and the bubble isolation shield 2 is provided with a second exhaust hole 24. The first exhaust hole 12 and the second exhaust hole 24 intercommunicate. The first exhaust hole 12 and the second exhaust hole 24, which intercommunicate, may be provided for cross-ventilation between the testing section and the outside, thereby ensuring that the solution to be tested may enter the testing section. In the present embodiment, the central axis of the first exhaust hole 12 and the central axis of the second exhaust hole 24 are a same straight line.

The optical concentration sensor protective casing further includes an air hole baffle plate 7. The air hole baffle plate 7 covers the first exhaust hole 12 and an interstice exists between the air hole baffle plate 7 and the first exhaust hole 12. The air hole baffle plate 7 may be disposed on the outer side of the first exhaust hole 12, so as to prevent the solution to be tested from directly entering the testing section through the first exhaust hole 12 and prevent such pollutants as dust from entering the testing section through the first exhaust hole 12 and affecting the precision of the testing result, thereby ensuring the reliability of the testing result. In the present embodiment, the air hole baffle plate 7 is secured to the upper fixing support 4.

An optical concentration testing device includes the above-mentioned optical concentration sensor protective casing and a sensor body 8. The sensor body 8 is mounted in the interior of the optical concentration sensor protective casing, the sensor body 8 is provided with a testing gap 81, and the testing gap 81 opens in the horizontal direction. The testing gap 81 is disposed on the horizontal side wall of the sensor body 8, so that bubbles in the solution to be tested may float up and be discharged easily along the testing gap 81 and thus be eliminated, thereby improving the precision of the testing result. In the present embodiment, the sensor body 8 is mounted within the middle fixing frame 3. The testing gap 81 is V-shaped. The testing gap 81 of the sensor body 8 may open in the horizontal direction and the side walls of the testing gap 81 slant. In this way, if bubbles in the solution to be tested are not eliminated, the remaining bubbles will float up along the side walls of the testing gap 81 and be discharged from the second exhaust hole, thereby eliminating bubbles in the solution to be tested.

In a testing process, the solution to be tested may enter the bubble separating cavity through the convection holes 11; the solution to be tested in the bubble separating cavity is blocked by the separating plates and is forced to change the flow direction of the solution to be tested instead of directly entering the liquid intake hole 23; after the solution to be tested flows to the end between the separating plates along the extending direction of the separating plates, the solution to be tested is on longer blocked by the separating plates and flows towards the liquid intake hole 23. Because of the small density of bubbles, the doped bubbles in the solution to be tested float up and are discharged from the solution to be tested. After bubbles are eliminated, the solution to be tested enters the testing section through the liquid intake hole 23 and the concentration of the solution to be tested is tested by the sensor body 8.

The terms "first" and "second" in the specification are only used for descriptive purposes and have no special meanings.

INDUSTRIAL APPLICABILITY

The present application provides an optical concentration sensor protective casing. The optical concentration sensor protective casing includes an outer cover and a bubble isolation shield. The bubble isolation shield is embedded on the inner side of the outer cover. The outer cover is provided with convection holes. The bubble isolation shield is provided with a liquid intake hole. The present application further provides an optical concentration testing device including the protective casing. With the protective casing provided to protect a sensor body, on the one hand, the sensor body is prevented from being damaged due to collision or squeeze to the sensor body, thereby prolonging the service life of the sensor body; on the other hand, a solution to be tested inside the protective casing tends to be still, thereby improving the precision of the testing result. In addition, an air hole baffle plate is disposed on the outer side of the outer cover to prevent the solution to be tested from directly entering a testing section in a pouring process and prevent such pollutants as dust that affect the precision of the testing result from entering the testing section, thereby ensuring the reliability of the testing result.

What is claimed is:

1. An optical concentration sensor protective casing, comprising an outer cover, a bubble isolation shield, and an air hole baffle plate, wherein
    the bubble isolation shield is embedded on an inner side of the outer cover;
    the outer cover is provided with a convection hole;
    the bubble isolation shield is provided with a liquid intake hole; and
    the outer cover is provided with a first exhaust hole, the air hole baffle plate covers the first exhaust hole, and an interstice exists between the air hole baffle plate and the first exhaust hole.

2. The optical concentration sensor protective casing according to claim 1, wherein the bubble isolation shield is provided with a second exhaust hole, the first exhaust hole and the second exhaust hole intercommunicate.

3. The optical concentration sensor protective casing according to claim 2, wherein the bubble isolation shield is made of elastic materials.

4. The optical concentration sensor protective casing according to claim 1, wherein an obstacle is disposed between the convection hole and the liquid intake hole and a solution to be tested bypasses the obstacle from the convection hole to the liquid intake hole.

5. The optical concentration sensor protective casing according to claim 4, wherein the outer cover is provided with two convection holes, the obstacle comprises two separating plates, the liquid intake hole is disposed between the two separating plates, and the two convection holes are disposed on respective outer sides of the two separating plates.

6. The optical concentration sensor protective casing according to claim 5, wherein the two separating plates are arranged in a splayed pattern.

7. The optical concentration sensor protective casing according to claim 6, wherein the two separating plates comprise a first separating plate and a second separating plate, the liquid intake hole is located between the first separating plate and the second separating plate and at an end where a distance between the first separating plate and the second separating plate is larger, and the liquid intake hole abuts the second separating plate.

8. The optical concentration sensor protective casing according to claim 7, wherein the bubble isolation shield is made of elastic materials.

9. The optical concentration sensor protective casing according to claim 6, wherein the bubble isolation shield is made of elastic materials.

10. The optical concentration sensor protective casing according to claim 5, wherein the bubble isolation shield is made of elastic materials.

11. The optical concentration sensor protective casing according to claim 4, wherein the bubble isolation shield is made of elastic materials.

12. The optical concentration sensor protective casing according to claim 1, wherein the bubble isolation shield is made of elastic materials.

13. An optical concentration testing device, comprising an optical concentration sensor protective casing, wherein the optical concentration sensor protective casing comprises an outer cover, a bubble isolation shield, and an air hole baffle plate, wherein the bubble isolation shield is embedded on an inner side of the outer cover;

the outer cover is provided with a convection hole;

the bubble isolation shield is provided with a liquid intake hole; and the outer cover is provided with a first exhaust hole, the air hole baffle plate covers the first exhaust hole, and an interstice exists between the air hole baffle plate and the first exhaust hole.

14. The optical concentration testing device according to claim 13, further comprising a sensor body, wherein the sensor body is provided with a testing gap and the testing gap opens in a horizontal direction.

15. The optical concentration testing device according to claim 13, wherein the bubble isolation shield is provided with a second exhaust hole, the first exhaust hole and the second exhaust hole intercommunicate.

16. The optical concentration testing device according to claim 13, wherein an obstacle is disposed between the convection hole and the liquid intake hole and a solution to be tested bypasses the obstacle from the convection hole to the liquid intake hole.

17. The optical concentration testing device according to claim 16, wherein the outer cover is provided with two convection holes, the obstacle comprises two separating plates, the liquid intake hole is disposed between the two separating plates, and the two convection holes are disposed on respective outer sides of the two separating plates.

18. An optical concentration sensor protective casing, comprising an outer cover and a bubble isolation shield, wherein the bubble isolation shield is embedded on an inner side of the outer cover;

the outer cover is provided with a convection hole;

the bubble isolation shield is provided with a liquid intake hole;

an obstacle is disposed between the convection hole and the liquid intake hole and a solution to be tested bypasses the obstacle from the convection hole to the liquid intake hole; and the outer cover is provided with two convection holes, the obstacle comprises two separating plates, the liquid intake hole is disposed between the two separating plates, and the two convection holes are disposed on respective outer sides of the two separating plates.

19. The optical concentration sensor protective casing according to claim 18, wherein the two separating plates are arranged in a splayed pattern.

20. The optical concentration sensor protective casing according to claim 19, wherein the two separating plates comprise a first separating plate and a second separating plate, the liquid intake hole is located between the first separating plate and the second separating plate and at an end where a distance between the first separating plate and the second separating plate is larger, and the liquid intake hole abuts the second separating plate.

* * * * *